United States Patent [19]

Horowitz et al.

[11] 4,124,539
[45] Nov. 7, 1978

[54] PB$_2$[M$_{2-x}$PB$_x$]O$_{7-y}$ COMPOUNDS WHEREIN M IS RU, IR OR MIXTURES THEREOF, AND METHOD OF PREPARATION

[75] Inventors: Harold S. Horowitz, Clark; John M. Longo, New Providence; Joel I. Haberman, Westfield, all of N.J.

[73] Assignee: Exxon Research & Engineering Co., Linden, N.J.

[21] Appl. No.: 856,646

[22] Filed: Dec. 2, 1977

[51] Int. Cl.$^2$ ............................................. H01B 1/08
[52] U.S. Cl. ................................. 252/518; 252/182.1; 423/619; 423/593; 429/40
[58] Field of Search ............................ 252/518, 182.1; 423/619, 593; 429/27, 40–45

[56] References Cited

U.S. PATENT DOCUMENTS

| | | | |
|---|---|---|---|
| 3,560,410 | 2/1971 | Schubert | 252/518 X |
| 3,682,840 | 8/1972 | Van Loan | 252/518 |
| 3,775,347 | 11/1973 | Bouchard | 252/518 |

OTHER PUBLICATIONS

Longo, J. M. et al., "Preparation and Properties of Oxygen Deficient Pyrochlores", *Mat. Res. Bull.* vol. 4, pp. 191–202, 1969.
Sleight, A. W., "New Platinum Metal Pyrochlores of the Type Pb$_2$M$_2$O$_{6-7}$", *Mat. Res. Bull.* vol. 6, p. 775, 1971.

*Primary Examiner*—Benjamin R. Padgett
*Assistant Examiner*—E. Suzanne Parr
*Attorney, Agent, or Firm*—Kenneth P. Glynn

[57] ABSTRACT

Novel lead-rich pyrochlore type compounds are described having the formula:

$$Pb_2[M_{2-x}Pb_x]O_{7-y}$$

wherein M is selected from the group consisting of Ru, Ir and mixtures thereof and wherein x is greater than 0 and less than or equal to about 1.2 and y is greater than or equal to 0 and less than or equal to about 1.0. A method of synthesizing these compounds is also described. The method involves the solid state reaction of a lead source and a ruthenium source and/or an iridium source at temperatures below about 600° C in an oxygen-containing environment.

21 Claims, 10 Drawing Figures

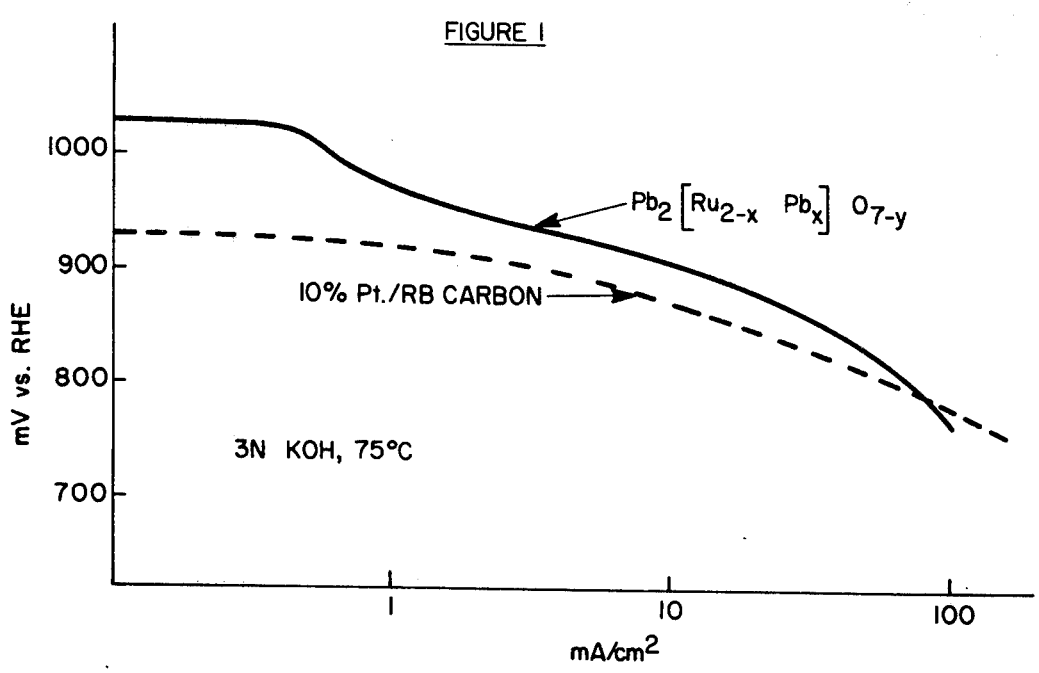
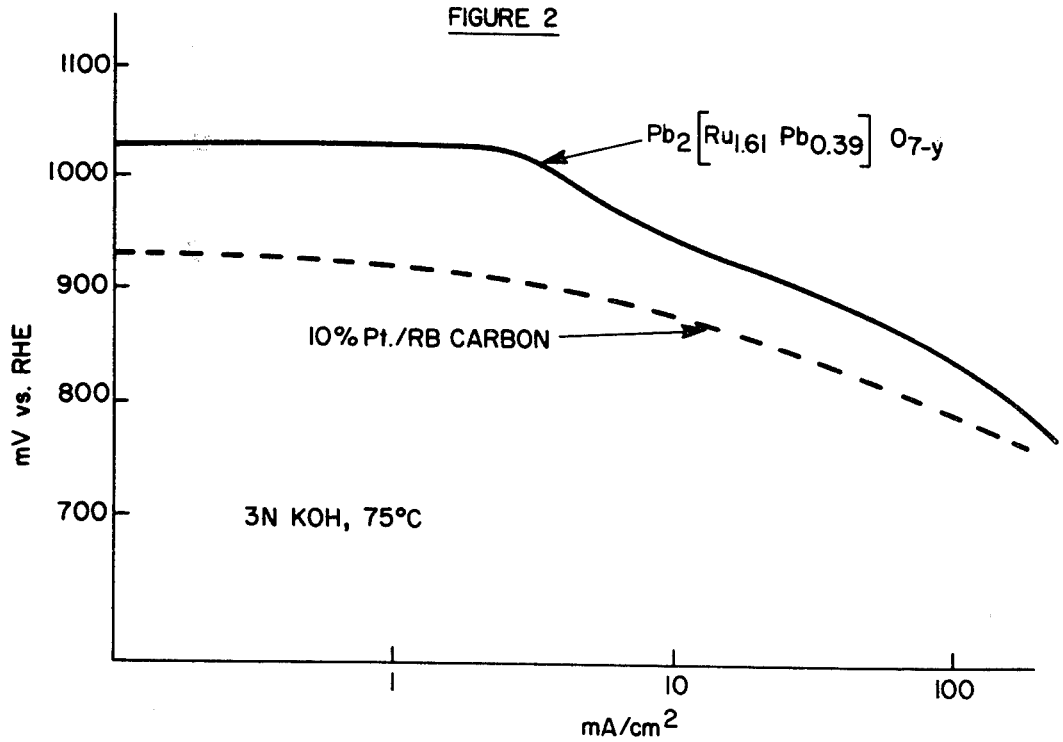

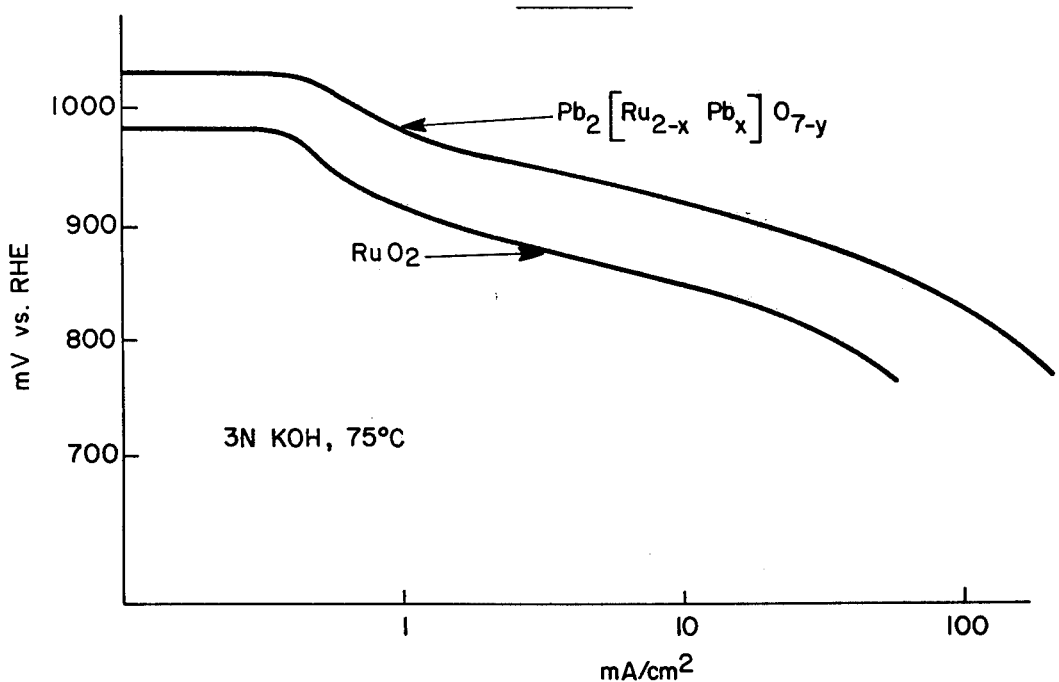
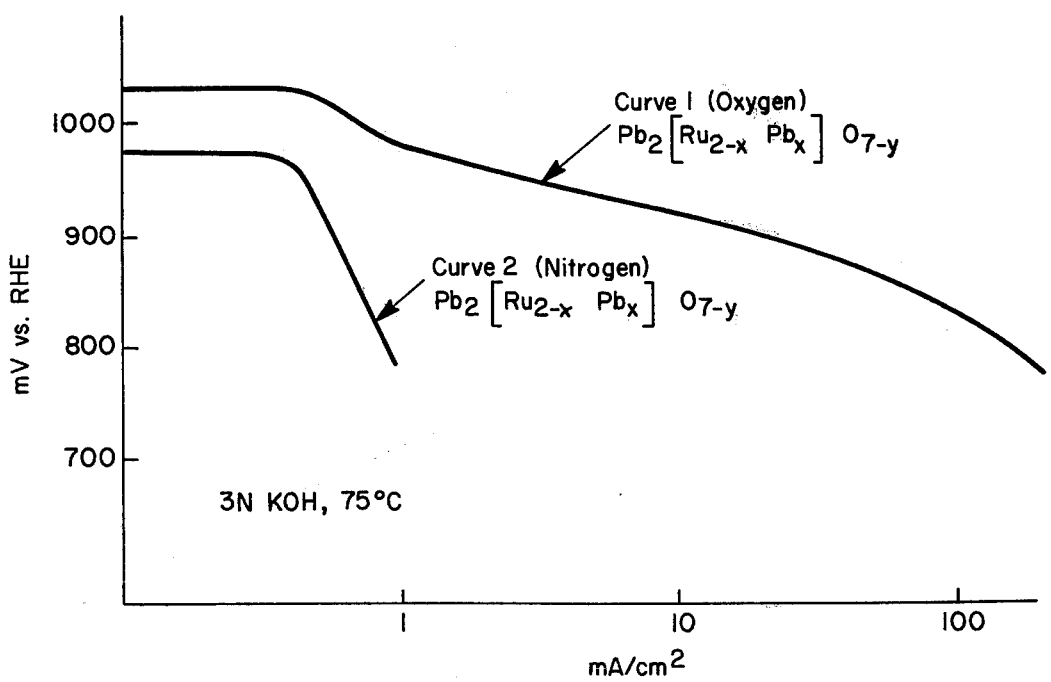

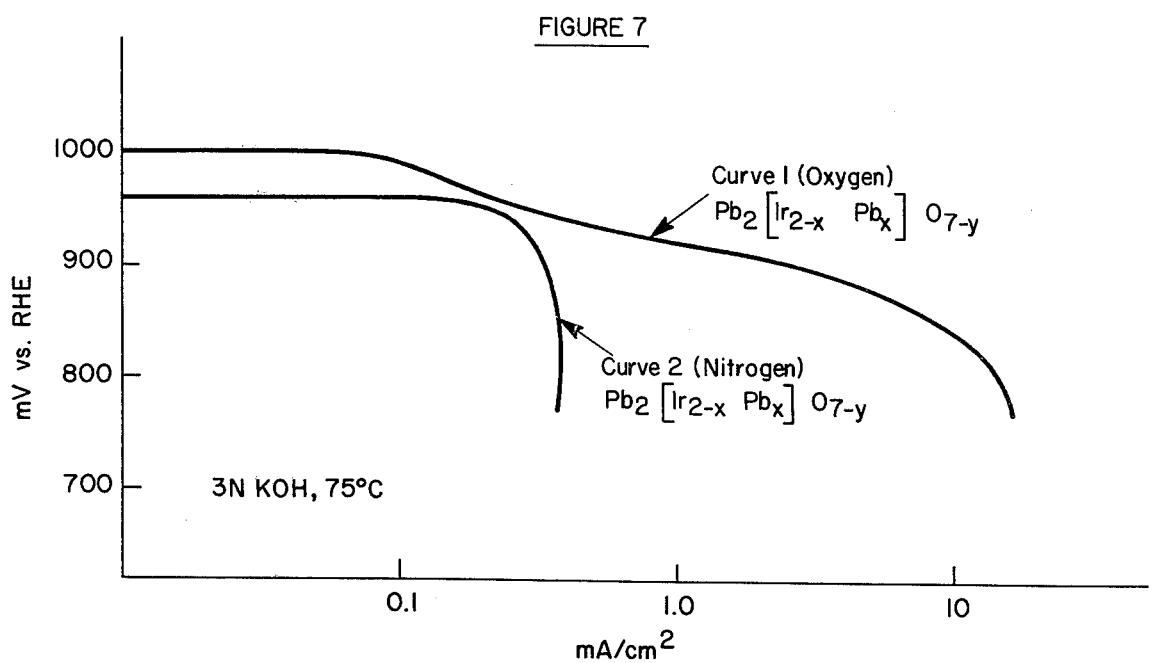
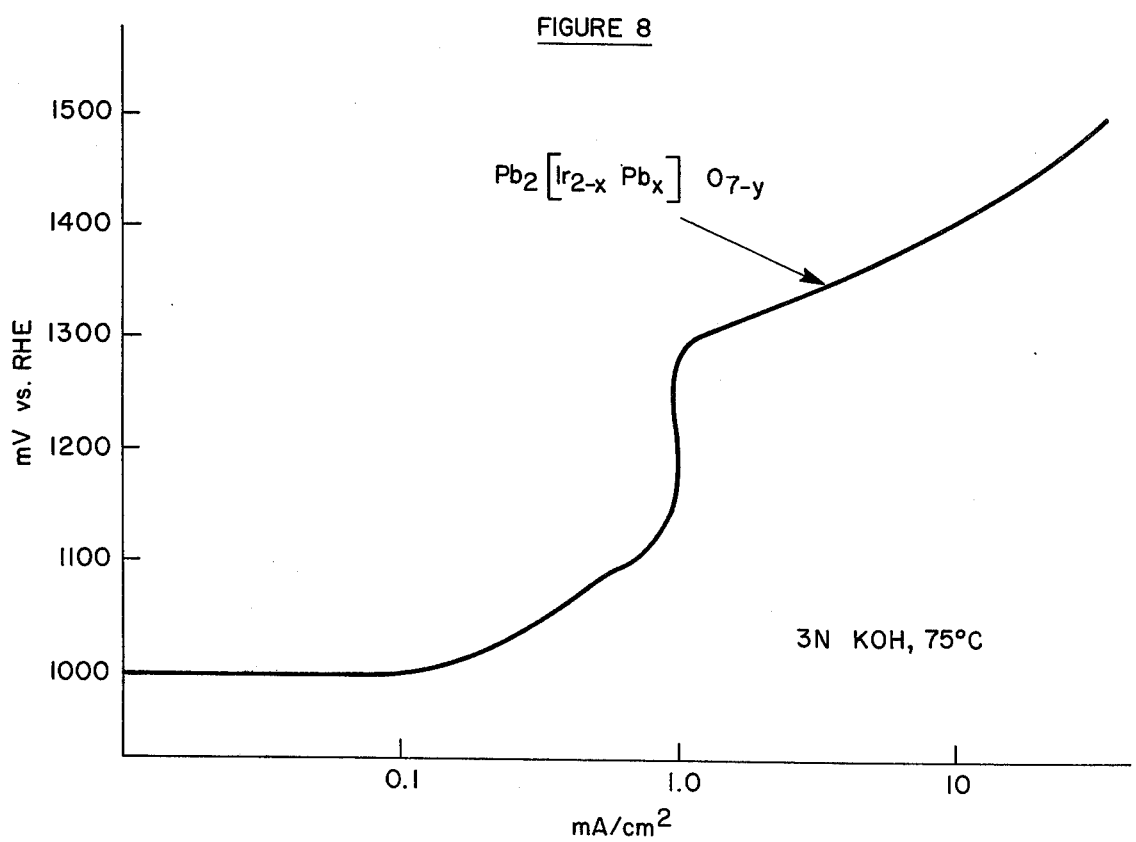

$Pb_2[M_{2-x}Pb_x]O_{7-y}$ COMPOUNDS WHEREIN M IS RU, IR OR MIXTURES THEREOF, AND METHOD OF PREPARATION

BACKGROUND OF THE INVENTION AND STATEMENT OF PRIOR ART

The present invention is directed to novel lead-rich pyrochlore type compounds having the formula $$Pb_2[M_{2-x}Pb_x]O_{7-y} \quad (1)$$

wherein M is selected from Ru, Ir, and mixtures thereof, $0 < x \leq 1.2$ and $0 \leq y \leq 1.0$. The compounds have many uses including, but not limited to, electrochemical applications. The present invention is also directed to a method of synthesizing these compounds involving solid state reaction at relatively low temperatures in an oxygen-containing environment.

A number of various types of electrochemical devices have been developed over the past few years for the production of electrical energy by electrochemical reaction and obversely for the consumption of electrical energy to effectuate electrochemical reactions. Many of these devices rely upon a reaction involving oxygen (or air) as part of the mechanism to accomplish the desired result. For example, such devices may contain oxygen electrodes which are oxygen reducing cathodes in which oxygen is catalytically electroreduced. Alternatively, such devices may contain oxygen electrodes which catalyze the evolution of oxygen from water. In general, these electrodes are known in the art as oxygen electrodes. Thus, metal-oxygen batteries, metal-air batteries, fuel cells, electrolyzers, metal electro-winning devices, etc., are among the well-known electrochemical devices which may contain oxygen electrodes. Typically, such devices contain electrocatalysts materials at one or more of their electrodes and precious metals, such as platinum (on carbon support) and silver (on carbon and other supports), are frequently employed as electrocatalysts.

In addition, various electrocatalytic alloys, compounds and compound mixtures have been developed for these electrochemical devices to achieve more desirable systems. For example, U.S. Pat. No. 3,536,533 (Kitamura) describes the use of an alloy of gold, silver, palladium and at least one of platinum, rhodium and ruthenium as a fuel cell electrode electrocatalyst, and U.S. Pat. No. 3,305,402 (Jones et al) describes the use of a combination of platinum and ruthenium oxides as an electrocatalyst. However, both references describe these catalysts as fuel cell anode (or fuel oxidation) catalysts. O'Grady et al. Technical Report No. 37, "Ruthenium Oxide Catalyst for the Oxygen Electrode", Contract No. N0014-67-A-0404-0006 (AD-779-899) Office of Naval Research, May 1974 (National Technical Information Service) describes the use of ruthenium oxide as an electrochemical catalyst for both the generation of oxygen and the reduction of oxygen. U.S. Pat. No. 3,405,010 (Kordesch et al) teaches that spinel type electrode catalysts have been found to produce better activation of the electrode and improved electrolyte repellency of the electrode by the inclusion of ruthenium.

The foregoing prior art describes various types of electrodes including those which utilize iridium and/or ruthenium-containing catalysts. However, none of these references teaches or renders obvious the novel, lead-rich pyrochlore type compounds of the present invention, much less their use as electrocatalysts.

Heretofore, the pyrochlore compounds $Pb_2Ru_2O_{7-y}$ (lattice parameter of 10.253Å) and $Pb_2Ir_2O_{7-y}$ (lattice parameter of 10.271Å), commonly referred to as lead ruthenate and lead iridate, respectively, have been known. Longo, Raccah and Goodenough, Mat. Res. Bull., Vol. 4, pp. 191-202 (1969) have described the compounds $Pb_2Ru_2O_{7-y}$ and $Pb_2Ir_2O_{7-y}$ and their preparation at elevated temperatures which are in excess of 700° C. Sleight, Mat. Res. Bull., Vol. 6, p. 775 (1971) has also described the compounds $Pb_2Ru_2O_{7-y}$ and $Pb_2Ir_2O_{7-y}$ (including the pyrochlore compound $Pb_2Ru_2O_{6.5}$ having a lattice parameter of 10.271Å) and their preparation at 700° C and 3000 atmospheres of pressure. U.S. Pat. No. 3,682,840 (Van Loan) describes the preparation of lead ruthenate at temperatures of 800° C and higher. These references do not teach that lead-rich compounds for Formula (1) above exist or that they may be prepared by solid state techniques at temperatures below about 600° C in an oxygen-containing environment. U.S. Pat Nos. 3,769,382 (Kuo et al) and 3,951,672 (Langley et al) both disclose the preparation of lead ruthenate and lead iridate using various techniques at temperatures of at least about 600° C, and preferably at higher temperatures. However, these references fail to recognize that the lead-rich pyrochlores of the present invention are obtained at generally lower temperatures or that such pyrochlores have improved physical properties. Further, in the event that some lead-rich pyrochlores are inherently and/or incidentally produced at the lower temperatures of the taught methods of these prior art patents, such inherency was not recognized nor were the beneficial properties of such pyrochlores appreciated.

Bouchard and Gillson, Mat. Res. Bull., Vol. 6, pp. 669-680 (1971) describe $Bi_2Ru_2O_7$ and $Bi_2Ir_2O_7$ preparation and properties, including the fact that these compounds have high conductivity and small Seebeck coefficients. However, there is no teaching that the lead-rich compounds of the present invention exist or that they are useful electrocatalysts in electrochemical devices. Derwent's Basic Abstract Journal, Section E. Chemdoc, Week No. Y25, Abstract No. 320 (August 17, 1977), Derwent Accession No. 44866Y/25 describes electrodes for electrolysis of alkaline and carbonate solutions which comprise nickel-plated steel strips coated with high conductivity layers containing $Cd_2Re_2O_{7-y}$, $Pb_2Re_2O_{7-4}Ni_2Re_2O_7$. These compounds are prepared by impregnating perrhenic acid and a metal nitrate such as Cd nitrate into a nickel strip and baking at 350° C. However, these compounds are all rhenates rather than ruthenates or iridates and are not taught to be lead-rich. National Bureau of Standards, Wash., D.C. Inst. for Mat. Research, Abstract of Rept. No. NBSIR-75-742 (1975) describes the use of mixed oxides as oxygen-reducing electrocatalysts in acid fuel cells, including the use of barium ruthenate. However, of all materials suggested for such electrocatalysts, none are even pyrochlore type structure compounds, much less the lead-rich type pyrochlore compounds in the present invention. Thus, it should be noted that, for example, barium ruthenate is not a pyrochlore whereas lead ruthenate is a pyrochlore.

In summary, there exists a formidable body of prior art describing the existence of various pyrochlores and their potential uses, and describing various metals and metal oxides as electrocatalyst materials. Notwithstanding such prior art, there is no suggestion or teaching that (a) the lead rich pyrochlore compounds of the present invention even exist, or that (b) the specific pyrochlores of the present invention may be prepared by the claimed method.

DESCRIPTION OF THE INVENTION

The present invention is directed to novel lead-rich pyrochlore type compounds having the formula:

$$Pb_2[M_{2-x}Pb_x]O_{7-y} \qquad (1)$$

wherein M is selected from the group consisting of Ru, Ir and mixtures thereof, and wherein $x$ is greater than 0 and less than or equal to about 1.2 and $y$ is greater than or equal to 0 and less than or equal to about 1.0.

The present invention is also directed to a method of preparation of these compounds involving solid state reaction at temperatures below about 600° C.

In one preferred embodiment of the present invention, the variable M is ruthenium and the compounds are represented by the formula:

$$Pb_2[Ru_{2-x}Pb_x]O_{7-y} \qquad (2)$$

wherein $x$ and $y$ are as described.

In another embodiment of the present invention, the variable M is iridium and the compounds are represented by the formula:

$$Pb_2[Ir_{2-x}Pb_x]O_{7-y} \qquad (3)$$

wherein $x$ and $y$ are as described.

In desired embodiments of the present invention, the variable $x$ is within the range of about 0.1 to about 1.0, preferably about 0.25 to about 0.8. Also, the variable $y$ is, as mentioned, within the range of about 0 to about 1.0. This variable represents an average value and takes into account the fact that a fraction of anion sites may be vacant in the crystal structure.

The compounds of the present invention, as represented by formulas (1), (2) and (3) above, display the pyrochlore crystal structure. Pyrochlore structure oxides are represented by the general formula $A_2B_2O_6O'$ wherein A and B are metal cations. A detailed description of their crystallographic structure may be found in *Structural Inorganic Chemistry*, Fourth Edition by A.F. Wells, Clarendon Press, Oxford, 1975. Briefly, oxides of this type display a face-centered cubic structure having a unit cell dimension of about 10Å. The B cations are octahedrally coordinated by oxygen anions (0). The structure framework is formed by a three-dimensional array of these corner shared octahedra, each sharing corners with six others. This framework has the composition $B_2O_6$. As Wells describes, this framework of octahedra is "based on the diamond net, having large holes which contain the O' and two A atoms, which themselves form a cuprite-like net $A_2O'$ interpenetrating the octahedral framework". The octahedra are actually arranged in tetrahedral clusters. These clusters of octahedra are then tetrahedrally arranged so as to form the large holes in the structure described by Wells. Each of these large holes may also be defined by four tetrahedrally arranged puckered, hexagonal rings which are formed by the corner shared octahedra. The A cations reside in the center of these puckered hexagonal rings and are coordinated by the six 0 anions which define the rings plus two more 0' cations at a slightly different distance. These 0' anions reside at the center of the large holes in the octahedral framework. It is the 0' anions which may be partially or totally absent, leading to the general pyrochlore oxide formula $A_2B_2O_{7-y}$ where $0 \leq y \leq 1$. Thus, the compounds of the present invention are referred to as pyrochlore compounds, albeit they are not stoichiometric pyrochlores, but rather are lead-rich compounds of the formulas above.

It has been discovered that the pyrochlore compounds of the present invention exhibit an expanded lattice, believed to be a result of the increased amount of lead in the crystal structure. Although merely a hypothesis at the present time, it is believed that there may exist a direct correlation between the extent of expansion of the lattice and the amount of excess lead (relative to a lead to metal M ratio of 1.0:1.0) in the crystalline structure. Thus, it is believed that all things otherwise being equal, the greater the lattice parameter, the greater the amount of lead and therefore the larger the variable $x$ in the formula representing the compounds of the present invention. This is supported by the fact that all compounds of the present invention which have been prepared and lattice parameters determined do indeed exhibit expanded lattices.

The compounds of the present invention, as represented by Formulas (1), (2) and (3) above, are prepared by solid state reaction. This solid state synthesis of the lead-rich pyrochlore type of compounds is achieved at elevated temperatures below about 600°C by reacting a powdered lead source and a powdered metal source selected from the group consisting of ruthenium sources, iridium sources and mixtures thereof, in an oxygen-containing environment. Generally, the oxygen-containing environment may be created either by including as one or more of the reactants an oxygen-containing compound, or by reacting the reactants in an oxygen-containing atmosphere. Preferably, the oxygen-containing environment is achieved by reacting one or more oxygen-containing reactants in an oxygen-containing atmosphere, e.g. air or oxygen.

The powdered lead source and the powdered metal source may be selected from any of those which release or contribute the lead or metal at elevated temperatures for reaction. Desirably, the lead source is lead nitrate or lead oxide, and is preferably lead nitrate. The metal source may be selected from elemental ruthenium and iridium, and the ruthenium and iridium salts such as the chlorides of ruthenium and iridium, the nitrate of ruthenium, and the oxides of ruthenium and iridium. The metal source is desirably selected from nitrate of ruthenium, the chloride of iridium and the oxides of ruthenium and iridium, and is preferably selected from ruthenium nitrate and iridium oxide. Also, a ruthenium source is preferred.

In general, the lead source and the metal source are employed in an amount so as to achieve initial reactant lead to metal ratio of at least about 1.0:1.0. Desirably, this ratio is within the range of about 1.1:1.0 to about 10:1.0. In the preferred embodiments, the lead to metal ratio is about 1.3:1.0 to about 5:1.0. As a practical matter, the reactant mixture may contain a lead to metal ratio appreciably higher than the final reacted product. After reaction, this excess lead can be removed by techniques described below. Thus, employing an excess of lead in the reactant mixture insures that the pyrochlore product incorporates the maximum amount of lead possible and therefore minimizes the expensive precious metal content.

The lead source reactant and the metal source reactant are combined in powder form and may be blended by any known technique, e.g. mechanical blending. The combined reactants are then fired, in the mentioned oxygen-containing environment, e.g. in a conventional furnace, for a period of time sufficient for the reactants to produce a desired amount of product compound of the present invention. In general, elevated temperatures below about 600° C may be used. Thus, any temperature below this temperature which causes the reaction to occur may be used and the minimum reaction temperature may be dictated by the kinetic limitations of the solid state reaction. Desirably, the temperature is in the range of about 275° C to about 575° C and is preferably about 300° C to about 500° C. It is believed that the lower the temperature within this range, the greater the degree of lead enrichment of product compound, provided that the reactant mixture has access to a sufficiently large reserve of lead so that the product can take up the maximum amount of lead that can be incorporated into the structure. Stated another way, at any of the temperatures of reaction discussed in this invention there is a continuum of stable pyrochlore phases having the formula $Pb_2[M_{2-x}Pb_x]O_{7-y}$ where $x$ will range all the way down to 0. To insure synthesis of a pure lead-rich pyrochlore, the appropriate excess of lead (relative to a lead to metal ratio of 1.0:1.0) should be provided such that the desired value of $x$ is obtained in the final product.

The length of time to which the firing is maintained is a matter of choice, and within limits, the longer the firing time, the greater the extent of reaction and, subsequently, the higher the purity of the reacted product obtained. As a practical matter, a significant amount of reaction is obtained after firing for a few hours, and generally a firing time of about 8 to about 120 hours is advantageous.

Optional treatment may be employed either before or after firing the lead source and the metal-source, as desired. For example, pretreatment may be used to obtain more highly reactive reactants. Thus, reactants including a metal source and, for example, lead nitrate, may be dissolved in aqueous solution and coprecipitated out in aqueous ammonium hydroxide to produce lead nitrate and a hydrated metal source which is a more reactive mixture than is achieved when conventional solid state preparative techniques are employed. This pretreatment is illustrated in the examples below. Additionally, enhanced reaction rate and/or physical characteristics of the product compound may be achieved by grinding and firing and then regrinding the solid product and refiring. Also, impurities in the product such as certain lead oxides may be removed by leaching, as illustrated in the examples.

The novel lead rich pyrochlore type compounds of the present invention have been found to exhibit significant electrocatalytic properties and are useful in electrochemical devices as electrocatalysts. For example, the compounds of the present invention may be useful as electrocatalytic oxygen-reducing or air-reducing electrodes in applications such as metal-air batteries, metal-oxygen batteries and fuel cells or as electrocatalytic oxygen-evolving electrodes in applications such as electrolyzers, rechargeable metal-air and metal-oxygen batteries and zinc production by zinc electrowinning.

The present invention will be more fully appreciated in view of the following discussion of the Examples and Drawings. However, these examples and drawings are presented for purposes of illustration and the present invention should not be construed to be limited thereto.

BRIEF DESCRIPTION OF THE DRAWINGS

FIG. 1 illustrates an oxygen-reduction Voltage vs. Current Density graph for $Pb_2[Ru_{2-x}Pb_x]O_{7-y}$ and for platinum on carbon electrocatalysts;

FIG. 2 illustrates an oxygen-reduction Voltage vs. Current Density graph for $Pb_2[Ru_{1.61}Pb_{0.39}]O_{7-y}$ and for platinum on carbon electrocatalysts;

FIG. 3 illustrates an oxygen-reduction Voltage vs. Current Density graph for $Pb_2[Ru_{2-x}Pb_x]O_{7-y}$ and for $RuO_2$ electrocatalysts;

FIG. 4 illustrates an oxygen-reduction Voltage vs. Current Density graph for $Pb_2[Ru_{2-x}Pb_x]O_{7-y}$ electrocatalyst in oxygen and in nitrogen;

FIG. 7 shows an oxygen reduction Voltage vs. current Density graph for $Pb_2[Ir_{2-x}Pb_x]O_{7-y}$ in oxygen and in nitrogen;

FIG. 8 illustrates a Voltage vs. Current Density graph for oxygen evolution for $Pb_2[Ir_{2-x}Pb_x]O_{7-y}$;

DETAILED DESCRIPTION OF THE DRAWINGS AND THE EXAMPLES

EXAMPLE 1

Figure 5:
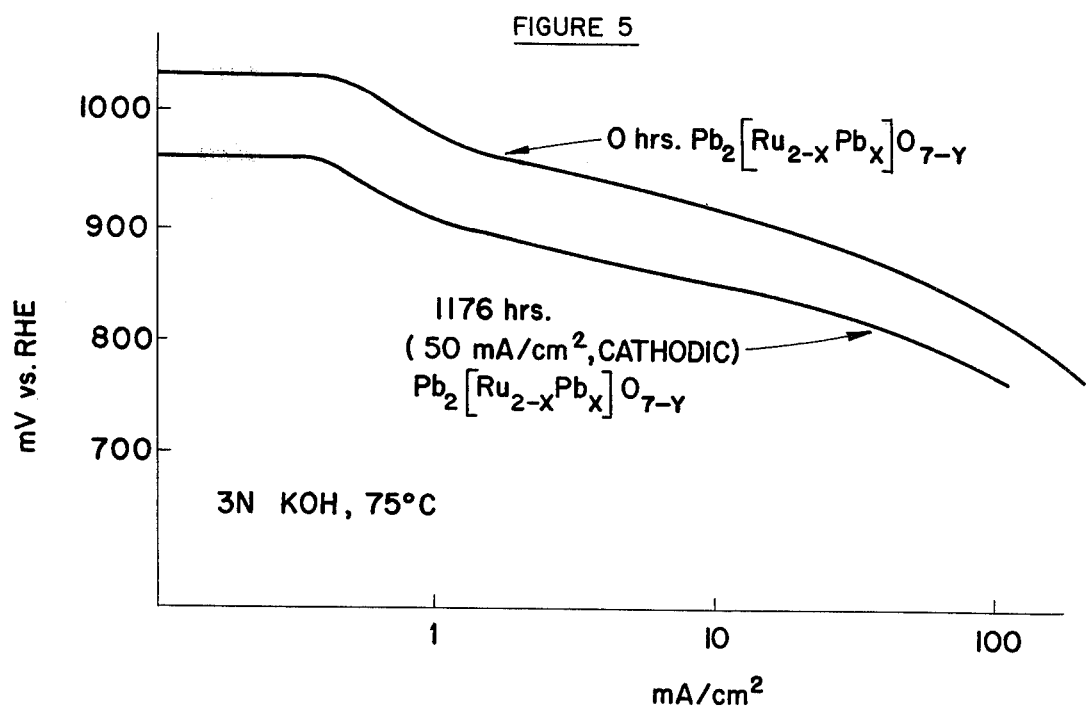
FIG. 5 illustrates an oxygen-reduction Voltage vs. Current Density graph for $Pb_2[Ru_{2-x}Pb_x]O_{7-y}$ electrocatalyst at time 0 hrs and after 1176 hrs of electrocatalytic oxygen reduction.

The prior art compound $Pb_2Ru_2O_{7-y}$ is prepared as follows:

A mixture of powdered, mechanically blended $Pb(NO_3)_2$ and $RuO_2$ in amounts so as to achieve a lead to ruthenium molar ratio of approximately 1.5:1.0 is reacted at 850° C. for 20 hours in air with one interruption for regrinding. The resulting reacted powder is washed with an alkaline solution to leach out any excess PbO. X-ray diffraction indicates that the reacted and washed powder is single phase $Pb_2Ru_2O_{7-y}$. The surface area is determined by the BET $N_2$ absorption method to be about 3 m²/g. This example illustrates that, even though an excess of lead-containing reactant is employed, the resulting product compound from the usual high temperatures firing is $Pb_2Ru_2O_{7-y}$ and is not lead-rich.

EXAMPLE 2

The prior art compound $Pb_2Ru_2O_{7-y}$ is again prepared using $Pb(NO_3)_2$ and $RuO_2$ but using a lead to ruthenium molar ratio of 2:1. The ground, blended mixture was fired in air for 276 hours at 400° C, 156 hours at 500° C, 45 hours at 600° C and 53 hours at 700° C with 15 interruptions for regrinding. The resulting powder is found to contain $Pb_2Ru_2O_{7-y}$ and PbO. The PbO is leached out with 9N KOH, leaving only single phase $Pb_2Ru_2O_{7-y}$ having a surface area of 6 m²/g. Thus, notwithstanding a two-fold amount of lead to ruthenium, a lead-ruthenium equimolar product compound is obtained.

EXAMPLE 3

A compound of the present invention having the formula Pb[Ru$_{2-x}$Pb$_x$]O$_{7-y}$ in mixture with Pb$_2$Ru$_2$O$_{7-y}$ is prepared as follows:

A mechanically blended mixture of Pb(NO$_3$)$_2$ and RuO$_2$ in a lead to ruthenium molar ratio of 4:1 is fired at 400° C in air for 25 hours with 2 regrindings. The excess lead, Pb$_3$O$_4$, is leached away with acetic acid. The resulting pyrochlore oxide has a surface area of 9 m$^2$/g, and X-ray diffraction reveals that the oxide powder contains two phases, one corresponding to Pb$_2$Ru$_2$O$_{7-y}$ and the other corresponding to Pb$_2$[Ru$_{2-x}$Pb$_x$]O$_{7-y}$. It is believed that the lower temperature of synthesis results in a stable compound in which a fraction of the ruthenium (Ru$^{+4}$) is substituted by lead (Pb$^{+4}$) ions. Thus, in the formula of the compounds of the present invention:

$$Pb_2[M_{2-x}Pb_x]O_{7-y} \qquad (1),$$

it is believed that the Pb$_2$ component consists of Pb$^{+2}$ ions whereas the Pb$_x$ component consists of Pb$^{+4}$ ions. The Pb$^{+4}$ ion has a larger ionic radius (0.775Å) than the Ru$^{4+}$ ion (0.620Å). Therefore, a larger unit cell dimension of the crystal lattice is expected to be obtained if Pb$^{4+}$ were to substitute for Ru$^{4+}$. In fact, a resulting expanded lattice is confirmed by X-ray diffraction.

The Miller indices and interplanar spacings for the X-ray diffraction patterns of pure Pb$_2$Ru$_2$O$_{7-y}$ and for the Pb$_2$[Ru$_{2-x}$Pb$_2$]O$_{7-y}$ lead-rich compound of the product of Example 3 are shown in Tables I and II, respectively. As can be seen by comparing the tables, significant differences exist for the two types of compounds.

Table I

X-Ray Diffraction Powder Pattern for Pb$_2$Ru$_2$O$_{7-y}$

| hkl | d(Å) |
| --- | --- |
| (111) | 5.920 |
| (311) | 3.0914 |
| (222) | 2.960 |
| (400) | 2.563 |
| (331) | 2.352 |
| (333) (511) | 1.973 |
| (440) | 1.813 |
| (531) | 1.733 |
| (622) | 1.546 |
| (444) | 1.480 |
| (553) (731) | 1.335 |
| (800) | 1.282 |
| (733) | 1.253 |
| (662) | 1.176 |
| (840) | 1.146 |
| (844) | 1.046 |

Table II

X-Ray Diffraction Powder Pattern for Pb$_2^{2+}$[Ru$_{2-x}$Pb$_x^{4+}$]O$_{7-y}$

| hkl | d(Å) |
| --- | --- |
| (111) | 6.06 |
| (222) | 3.02 |
| (400) | 2.60 |
| (331) | 2.38 |
| (440) | 1.84 |
| (622) | 1.57 |
| (444) | 1.50 |
| (800) | 1.30 |

EXAMPLE 4

To illustrate the utility of the compound which is obtained by the method of Example 3, performance curves for the electrocatalytic reduction of oxygen at 75° C in 3N KOH are obtained using the lead-rich compound-containing catalyst of Example 3 and using platinum supported (10% by weight) on active carbon. The platinum on carbon electrode is typical of conventionally used supported noble metal electrocatalysts. In these tests, the material is fabricated into test electrodes consisting of the catalyst, a binder, a wetproofing agent and a support. Teflon serves as both a binder and wetproofing agent for all the electrodes tested. Gold expanded metal screen is used as the support.

Electrodes are fabricated by mixing a weighed amount of catalyst with a few drops of water, adding a measured volume of Teflon 42 suspension, and mixing vigorously to precipitate the Teflon. The gummy product is then spread on a weighed gold Exmet screen and is pressed dry between filter paper. The electrode is then cold pressed for 0.5 min. at 200 psi, is allowed to air dry for 30 min., and is then hot pressed at 325° C, 500 psi for 0.5 min. After cooling, the electrode is weighed to determine its loading and then placed in the electrochemical cell for testing.

The electrochemical half-cell used for testing is of the interface maintaining type and consists of a jacketed liquid phase cell compartment and a gas phase cell compartment. The liquid side contains the platinum wire counter electrode, a saturated calomel reference electrode (in contact by Lugin capillary), and magnetic stirrer. The gas side contains the gas (oxygen) inlet and outlet and a stop-cock to drain off any condensate. The working electrode is held in place (between the two compartments) between two Teflon discs with a gold current collector pressing against it.

The cell is connected to a Princeton Applied Research Model 173 potentiostat with a programmer and logarithmic current converter. Constant rate potential sweep measurements are conducted. Outputs of potential and log of current are recorded on an x-y plotter, and the resulting potential vs. log current density plot, referred to as a performance curve, is used to evaluate the electrode activity. These results are shown in the Voltage-Current Density Graph of FIG. 1 and establish that the lead-rich compound of the present invention has oxygen-reduction capability superior to a conventional supported platinum electrocatalyst in the tested environment.

EXAMPLE 5

The compounds of the present invention contain various amounts of lead which has replaced, in part, the ruthenium or iridium in the pyrochlore structure. The extent to which Ru is replaced by lead is determined by changing the temperature of synthesis provided an adequate amount of lead is present. It is found that the amount of Ru replaced by lead gradually increases with decreasing temperatures. This change in lead to ruthenium ratio is monitored by observing the increase in lattice parameter as more ruthenium is replaced by lead. In air, at atmospheric pressure and a temperature greater than approximately 675° C, Pb$_2$Ru$_2$O$_{7-y}$ becomes the equilibrium phase. Stated another way, x in the formula Pb$_2$[M$_{2-x}$Pb$_x$]O$_{7-y}$ appears to become greater than zero at synthesis temperatures lower than about 675° C when M is ruthenium. When M is iridium, the lead-rich pyrochlore phase ($x>0$) remains stable to temperatures slightly greater than 675° C. Thus, it is estimated that significant expansion of the pyrochlore structures occurs at synthesis temperatures at and below about 600° C. If synthesis temperatures as low as 300° C (at 1 atmosphere of air) are employed, $x$ may reach a maximum value of about 1.2 with very significantly expanded pyrochlore structures resulting.

EXAMPLE 6

Solid state synthesis of the lead-rich pyrochlore, e.g., $Pb_2[Ru_{2-x}Pb_x]O_{7-y}$, is facilitated by employing a co-precipitation technique such as follows:

$Pb(NO_3)_2$ and $Ru(NO_3)_3$ are combined in aqueous solution in a 2:1 molar ratio of lead to ruthenium. That is, about 5.241 grams of $Pb(NO_3)_2$ and about 2.27 grams of $Ru(NO_3)_3$ (as aqueous solution) are added to about 0.250 liters of $H_2O$. To this solution is added a large excess (about 0.125 liters) of 14.8N $NH_4OH$. A precipitate immediately appears and the suspension is stirred for ½ hour. The solids are found to be predominantly $Pb(NO_3)_2$ and hydrated ruthenium oxide. The suspension is then placed in an oven at 300° C and left overnight so that evaporation to dryness and subsequent solid state reaction are achieved in one continuous step. The resulting oxide is then washed in alkali such as $NH_4OH$ or $KOH$ or in acetic acid in order to leach out any excess lead oxide which is formed. The alkali or acid washing media may be heated in order to facilitate leaching of the lead oxide. In a typical synthesis, 3N KOH at 75° C is used as the washing medium and the oxide is continually washed with fresh hot KOH and separated by filtration. The sequence is repeated (using fresh KOH for each washing) until lead can no longer be detected in the filtered washing medium. X-ray diffraction shows that the washed and dried product is a single phase crystalline material exhibiting the pyrochlore crystal structure. The indices and interplanar spacings for the X-ray diffraction reflections for this compound are given in Table III below. Comparison with the X-ray diffraction pattern of $Pb_2Ru_2O_{7-y}$ (given in Table I) shows that the compound of the present example has a crystal lattice that is expanded relative to $Pb_2Ru_2O_{7-y}$ and, thus, is a significantly different and new material. The lead to ruthenium ratio as determined experimentally by X-ray fluorescence is 1.48 ± .03:1.0. The formula for this pyrochlore may be expressed as $Pb_2[Ru_{1.61}Pb_{0.39}]O_{7-y}$.

Table III

| X-Ray Diffraction Powder Pattern for $Pb_2[Ru_{1.61}Pb_{0.39}]O_{7-y}$ | |
|---|---|
| hkl | d(Å) |
| (111) | 6.01 |
| (222) | 3.02 |
| (400) | 2.60 |
| (331) | 2.39 |
| (333) (511) | 2.00 |
| (440) | 1.84 |
| (622) | 1.57 |
| (444) | 1.50 |
| (800) | 1.30 |
| (662) | 1.19 |
| (840) | 1.16 |

EXAMPLE 7

To illustrate the utility of the compound prepared in Example 6, performance curves for the electrocatalytic reduction of oxygen at 75° C in 3N KOH are obtained using the lead-rich compound and using platinum supported (10% by weight) on active carbon. The platinum on carbon electrode is typical of conventionally used supported noble metal electrocatalysts. The results are shown on the Voltage-Current Density Plot of FIG. 2 and establish that the pure lead-rich compound of the present invention has oxygen-reduction capability superior to a conventional supported platinum electrocatalyst in the tested environment.

EXAMPLE 8

A lead-rich pyrochlore of the present invention is prepared by adding a large excess of $NH_4OH$ to an aqueous solution of lead nitrate and ruthenium nitrate in a 1:1 lead to ruthenium molar ratio. This suspension is evaporated to dryness and reacted in one continuous heating at 300° C for about 16 hours. X-ray diffraction shows the material to have a pyrochlore structure characteristic of the lead-rich variety. Since a 1:1 molar mixture of lead to ruthenium is used in this preparation, excess lead oxide is not present, and the alkali leaching step is not necessary. Excess $RuO_2$ is detected as a trace phase in the X-ray diffraction pattern.

EXAMPLE 9

Figure 6:
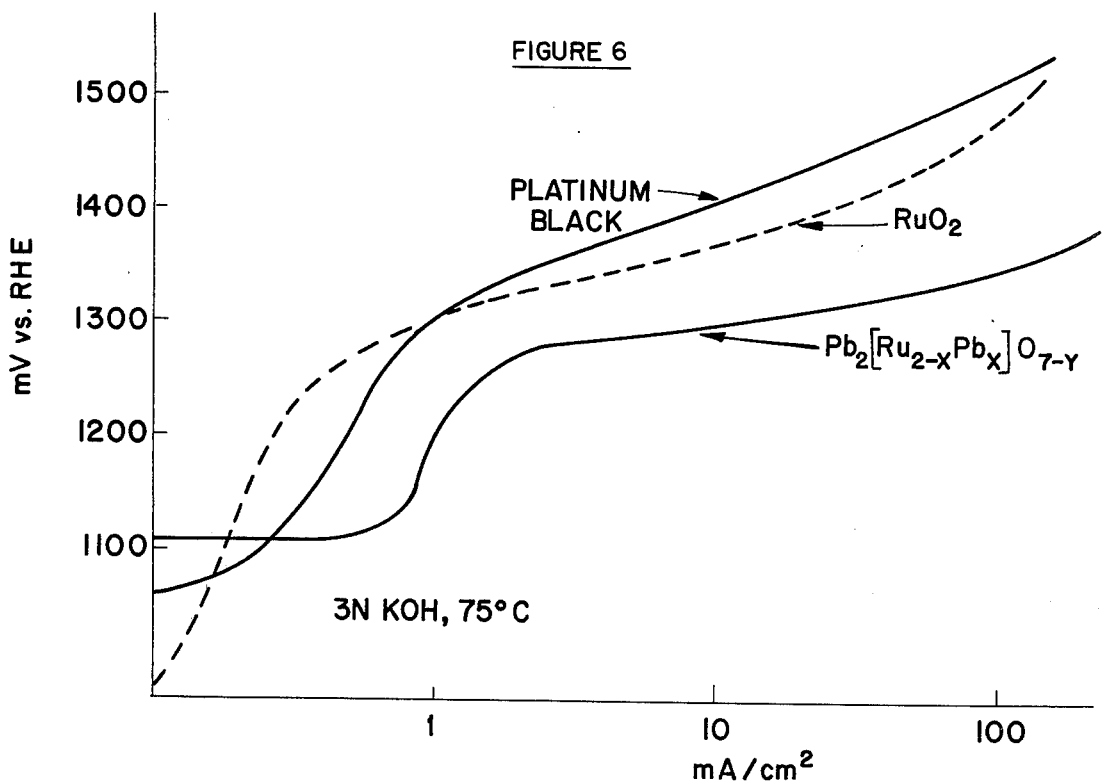
FIG. 6 shows a Voltage vs. Current Density graph for oxygen evolution for $Pb_2[Ru_{2-x}Pb_x]O_{7-y}$ for $RuO_2$ and for platinum black.

The product obtained by the procedure of Example 8 is tested for electrocatalytic activity. The Voltage-Current Density Graph of FIG. 3 shows the performance curve for the electrocatalytic reduction of oxygen in 3N KOH at 75° C with the lead-rich pyrochlore of Example 8. Also included in FIG. 3 is the performance curve for pure $RuO_2$ which has been heretofore recognized as an oxygen electrocatalyst. A comparison of the curves of FIG. 3 will show that the favorable electrochemical activity which is obtained with this electrode is not due to the presence of a minor phase of $RuO_2$. FIG. 4 compares the Voltage-Current Density Graphs of $Pb_2[Ru_{2-x}Pb_x]O_{7-y}$ when oxygen is continually supplied to the electrochemical cell (curve 2) as has been shown in FIG. 3 and when the cell is purged with nitrogen and the performance curve is run with nitrogen continually supplied to the cell (curve 2). When the electrode is supplied with only nitrogen, the electrode activity is eliminated. This demonstrates that the activity exhibited by the electrode in oxygen is truly catalytic in nature and is not just the electrochemical reduction of the active material taking place. This particular electrode is next tested in the oxygen electro-reduction mode for 1176 hours at a current density of 50 mA/cm² before the test is terminated in order to do additional experiments on the electrode. FIG. 5 shows the initial performance curve of the electrode as compared to the performance curve obtained after 1176 hours. After 1176 hours, the electrode is examined by X-ray diffraction. No change is detected in the X-ray pattern, thereby indicating that the lead-rich pyrochlore structure remains unchanged with use. After completion of the 1176 hour life test, this same electrode is cycled between 8 hour periods of oxygen reduction (25 mA/cm²) and 16 hour periods of oxygen evolution (12.5 mA/cm²) for an additional 266 hours, again without experiencing any serious loss of activity or any chemical or structural changes. FIG. 6 shows a performance curve for the evolution of oxygen in 3N KOH at 75° C with the life tested electrode obtained at the 1176 hour mark. Also included for comparison are oxygen evolution performance curves for $RuO_2$ and platinum black. It is evident that the oxygen over-potential (anodic polarization) at any current density is much greater for platinum or $RuO_2$ than it is for the lead-rich pyrochlore, demonstrating that the used lead-rich pyrochlore compound of the present invention remains a superior electrocatalyst.

EXAMPLE 10

The prior art compound $Pb_2Ir_2O_{7-y}$ is prepared as follows:

A mechanically blended mixture of $Pb(NO_3)_2$ and $IrO_2$ in a lead to iridium molar ratio of 4:1 is fired for 50 hours at 500° C, 28 hours at 600° C, 7 hours at 700° C, 130 hours at 850° C, all in air with 12 regrindings. Excess lead oxides are leached away with successive washes of acetic acid at room temperature and 3N KOH at 75° C. X-ray diffraction indicates that the resulting powder is single phase $Pb_2Ir_2O_{7-y}$. The surface area, measured by the BET $N_2$ absorption method, is 0.6 m$^2$/g. Thus, notwithstanding a fourfold amount of lead to iridium, a lead-iridium equimolar product compound is obtained.

EXAMPLE 11

A lead iridate pyrochlore electrocatalyst having a lead-rich composition, $Pb_2[Ir_{2-x}Pb_x]O_{7-y}$, is prepared as follows:

A mechanically blended mixture of $Pb(NO_3)_2$ and $IrO_2$ in a lead to iridium molar ratio of 3:1 is fired for 2 hours at 500° C, 71 hours at 600° C and 27 hours at 700° C, all in air, with 10 regrindings. The excess lead oxide (PbO) is leached away with 3N KOH at 70° C. The resulting pyrochlore oxide has a surface area of 0.8 m$^2$/g, and X-ray diffraction reveals that the oxide powder is lead-rich pyrochlore having a crystal lattice which is expanded relative to $Pb_2[Ir_2]O_{7-y}$. The formula of the lead-rich phase may be expressed as $Pb_2[Ir_{2-x}Pb_x]O_{7-y}$. The Miller indices and interplanar spacings for the X-ray diffraction pattern of $Pb_2Ir_2O_{7-y}$ and for the lead-rich compound of Example 11 are shown in Tables IV and V, respectively. As can be seen by comparing the Tables, significant differences exist for the two types of compounds.

$Pb_2[Ir_{2-x}Pb_x]O_{7-y}$ of Example 11 is tested as an oxygen electrode. FIG. 7 shows an electrocatalytic performance curve for the reduction of oxygen at 75° C in 3N KOH using the material of Example 11 as the catalyst (curve 1). When the electrochemical cell is purged with nitrogen and the performance curve is run with nitrogen, continually supplied (curve 2), the electrode activity is eliminated. This demonstrates that the activity exhibited by the electrode in oxygen is truly catalytic in nature.

FIG. 8 shows a performance curve for the evolution of oxygen in 3N KOH at 75° C using $Pb_2[Ir_{2-x}Pb_x]O_{7-y}$ of Example 11 as the catalyst.

Table IV

| X-Ray Diffraction Powder Pattern for $Pb_2Ru_2O_{7-y}$ | |
|---|---|
| hkl | d(Å) |
| (111) | 5.92 |
| (311) | 3.09 |
| (222) | 2.96 |
| (400) | 2.563 |
| (331) | 2.352 |
| (333) (511) | 1.973 |
| (440) | 1.813 |
| (531) | 1.733 |
| (622) | 1.546 |
| (444) | 1.480 |
| (553) (731) | 1.335 |
| (800) | 1.282 |
| (733) | 1.253 |
| (662) | 1.176 |
| (840) | 1.146 |
| (844) | 1.046 |

Table V

| X-Ray Diffraction Powder Pattern for $Pb_2^{2+}[Ru_{2-x}Pb_x^{4+}]O_{7-y}$ | |
|---|---|
| hkl | d(Å) |
| (111) | 6.06 |
| (222) | 3.02 |
| (400) | 2.60 |
| (331) | 2.38 |
| (440) | 1.84 |
| (622) | 1.57 |
| (444) | 1.50 |
| (800) | 1.30 |

EXAMPLE 12

The electrocatalyst compound $Pb_2[Ru_{2-x}Pb_x]O_{7-y}$ is prepared as follows:

A mixture of powdered, mechanically blended $Pb(NO_3)_2$ and elemental ruthenium in amounts so as to achieve a 1.5:1.0 lead to ruthenium molar ratio is reacted in air for 3 hours at 300° C and for 44 hours at 500° C with 8 interruptions for regrinding. X-ray diffraction indicates that the reacted powder consists of major phase of $Pb_2[Ru_{2-x}Pb_x]O_{7-y}$ and minor phases of $Pb_3O_4$ and $RuO_2$.

EXAMPLE 13

The electrocatalyst compound $Pb_2[Ru_{2-x}Pb_x]O_{7-y}$ is prepared as follows:

A mixture of powdered, mechanically blended $Pb(NO_3)_2$ and $RuO_2$ in amounts so as to achieve a lead to ruthenium molar ratio of approximately 4.0:1.0 is reacted in air for 1.75 hours at 400° C plus 22 hours at 600° C with 5 interruptions for regrinding. The resulting reacted powder is washed 1.5 hours at room temperature in 0.1N acetic acid plus 1.7 hours at room temperature in 0.05N acetic acid to leach out excess lead oxide phases. X-ray diffraction indicates that the product powder is a single phase pyrochlore of the type $Pb_2[Ru_{2-x}Pb_2]O_{7-y}$ with a lattice parameter that is expanded relative to the non-lead-rich pyrochlore $Pb_2Ru_2O_{7-y}$. The lead to ruthenium ratio as determined experimentally by X-ray fluorescence is 1.28:1.0. Thus, the formula for this particular pyrochlore may be expressed as $Pb_2[Ru_{1.82}Pb_{.18}]O_{7-y}$.

EXAMPLE 14

Lead ruthenate supported on glass frit is prepared by a procedure similar to Example 1 of U.S. Pat. No. 3,769,382 (Kuo et al), as follows:

A reducing solution is prepared by dissolving 4.80 grams of anhydrous potassium carbonate in 50 ml of distilled water. To this solution is added slowly a solution of 1.61 grams formic acid in 10 ml distilled water. A metal containing solution is prepared by dissolving 1.81 grams $RuCl_3$ in 35 ml distilled water. The reducing solution is heated at 85° C with stirring. To the reducing solution is added 18.0 grams of glass frit, with the following composition:

| Component | Weight Percent |
| --- | --- |
| PbO | 62.2 |
| $B_2O_3$ | 8.5 |
| $SiO_2$ | 21.4 |
| $Al_2O_3$ | 3.0 |
| CdO | 4.9 |

This glass frit is referred to as Drakenfeld E-1410 glass frit. The metal containing solution is added to the reducing solution at a rate of about 0.5 grams per minute with stirring. The stirring is continued for 1 hour with the temperature of the solution maintained at 85° C. During the subsequent stirring 20 ml of distilled water are added. The solution is allowed to settle and the clear, aqueous layer is drawn off. The resulting glass frit is washed with hot distilled water until the filtrate is free of precipitate when silver nitrate solution is added. The washed glass frit is filtered and dried to constant weight. The resulting glass frit is fired for 21 hours at 600° C in air. X-ray diffraction indicates that the reacted powder consists of a pyrochlore-type phase, which has a lattice parameter expanded relative to $Pb_2Ru_2O_{7-y}$, supported on glass frit.

EXAMPLE 15

To illustrate the comparative utilities of the materials prepared in Examples 13 and 14, performance curves for the electrocatalytic reduction and evolution of oxygen at 75° C in 3N KOH are obtained for these two materials.

Figure 9:
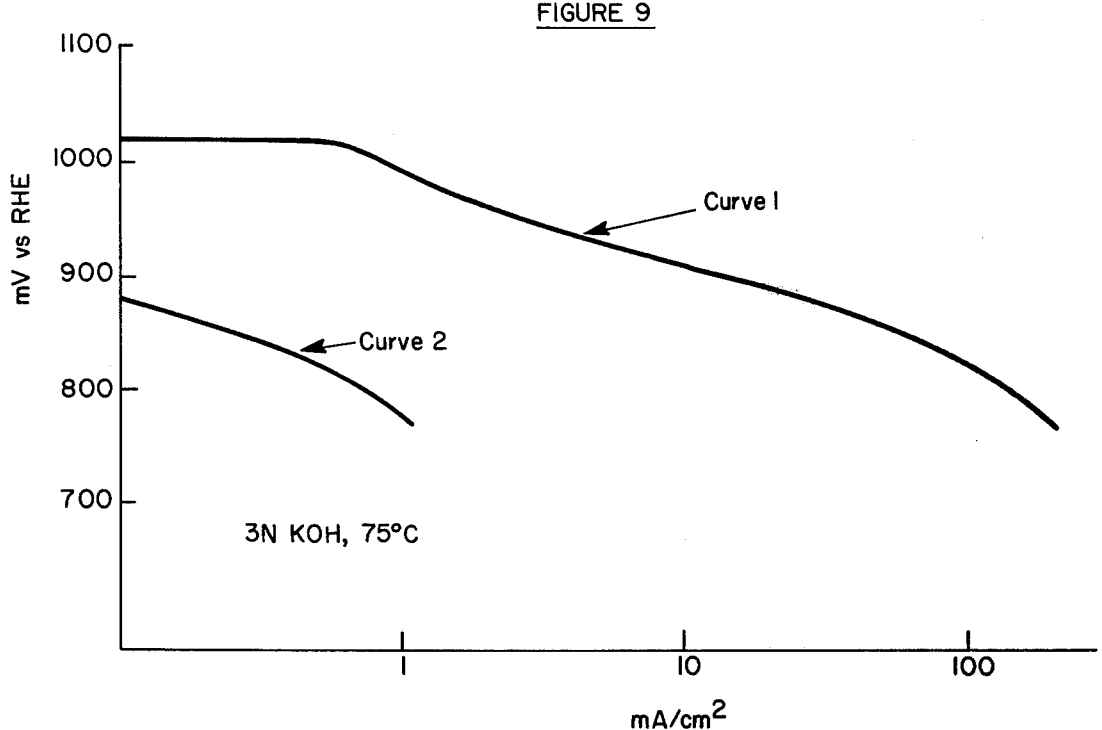
FIG. 9 illustrates an oxygen reduction performance curve for $Pb_2[Ru_{2-x}Pb_x]O_{7-y}$ of the present invention and for the prior art lead ruthenate on a glass frit; and, FIG. 10 illustrates oxygen evolution performance curves for the same compounds as illustrated in FIG. 9.

FIG. 9 is a Voltage-Current Density Graph which shows the performance for electrocatalytic reduction of oxygen exhibited by the materials of Examples 13 (curve 1) and 14 (curve 2), respectively. Comparison of the curves shows that while favorable electrochemical activity is obtained with $Pb_2[Ru_{1.82}Pb_{.18}]O_{7-y}$ of Example 13, negligible activity is obtained with the lead ruthenate supported on glass frit of Example 14.

Figure 10:
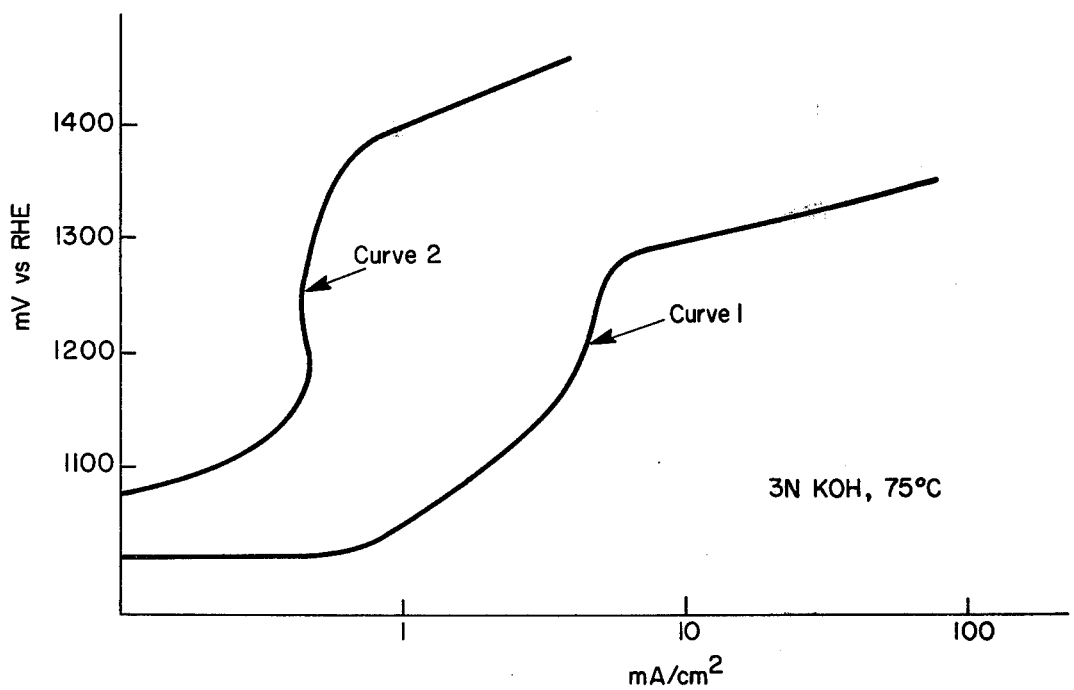

FIG. 10 is a Voltage-Current Density Graph which shows the performance for electrocatalytic evolution of oxygen exhibited by the materials of Examples 13 (curve 1) and 14 (curve 2), respectively. Comparison of the curves shows that while favorable electrochemical activity is obtained with $Pb_2[Ru_{1.82}Pb_{.18}]O_{7-y}$ of Example 13, negligible activity is obtained with the lead ruthenate supported on glass frit of Example 14.

All of the materials of the present invention discussed above were found to exhibit high conductivity. The resistivities are in the range $10^{-2}$ to $10^{-3}$ Ω cm when measured by the four probe method on pressed powder samples. The high conductivities displayed by these oxides make them particularly suitable for electrocatalytic applications.

What is claimed is:

1. A compound having the formula:

$$Pb_2[M_{2-x}Pb_x]O_{7-y}$$

wherein M is selected from the group consisting of Ru, Ir and mixtures thereof, wherein $x$ is greater than 0 and less than or equal to about 1.2, and wherein $y$ is greater than or equal to 0 and less than or equal to about 1.0.

2. The compound of claim 1 wherein M is Ru.
3. The compound of claim 1 wherein M is Ir.
4. The compound of claim 1 wherein $x$ is within the range of about 0.1 to about 1.0.
5. The compound of claim 4 wherein M is Ru.
6. The compound of claim 4 wherein M is Ir.
7. The compound of claim 1 wherein $x$ is within the range of about 0.25 to about 0.8.
8. The compound of claim 7 wherein M is Ru.
9. The compound of claim 7 wherein M is Ir.
10. A method of solid state preparation of a lead-rich pyrochlore compound of the ruthenate and/or iridate type, having the formula:

$$Pb_2[M_{2-x}Pb_x]O_{7-y}$$

wherein M is selected from the group consisting of Ru, Ir and mixtures thereof, wherein $x$ is greater than 0 and less than or equal to about 1.2, and wherein $y$ is greater than or equal to 0 and less than or equal to about 1.0, comprising:
(a) blending a mixture of a powdered lead source and a powdered metal source selected from the group consisting of ruthenium sources, iridium sources and mixtures thereof, so as to obtain a reactant mixture having a lead to metal molar ratio of at least about 1.0:1.0; and
(b) reacting said mixture at an elevated temperature below about 600° C in an oxygen-containing environment for a period of time sufficient to permit some reaction to occur.

11. The method of claim 10 wherein said lead source is selected from the group consisting of lead nitrate and lead oxide and said metal source is selected from the group consisting of elemental ruthenium, elemental iridium, ruthenium nitrate, iridium chloride and oxides of ruthenium and iridium.
12. The method of claim 11 wherein said metal source is a ruthenium source.
13. The method of claim 12 wherein said lead source is lead nitrate and said metal source is ruthenium nitrate.
14. The method of claim 11 wherein said metal source is an iridium source.
15. The method of claim 14 wherein said lead source is lead nitrate and said metal source is iridium oxide.
16. The method of claim 10 wherein said reacting occurs at a temperature within the range of about 275° C to about 575° C.
17. The method of claim 16 wherein said lead source is selected from the group consisting of lead nitrate and lead oxide and said metal source is selected from the group consisting of elemental ruthenium, elemental iridium, ruthenium nitrate, iridium chloride and oxides of ruthenium and iridium.
18. The method of claim 17 wherein said metal source is a ruthenium source.
19. the method of claim 18 wherein said lead source is lead nitrate and said metal source is ruthenium nitrate.
20. The method of claim 17 wherein said metal source is an iridium source.
21. The method of claim 20 wherein said lead source is lead nitrate and said metal source is iridium oxide.

* * * * *